United States Patent
Grüneis

(10) Patent No.: US 9,458,945 B2
(45) Date of Patent: Oct. 4, 2016

(54) VALVE

(71) Applicant: CONTINENTAL AUTOMOTIVE GMBH, Hannover (DE)

(72) Inventor: Stefan Oskar Grüneis, Eppstein (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/653,135

(22) PCT Filed: Dec. 9, 2013

(86) PCT No.: PCT/EP2013/075924
§ 371 (c)(1),
(2) Date: Jun. 17, 2015

(87) PCT Pub. No.: WO2014/095450
PCT Pub. Date: Jun. 26, 2014

(65) Prior Publication Data
US 2015/0330520 A1  Nov. 19, 2015

(30) Foreign Application Priority Data
Dec. 17, 2012  (DE) .................. 10 2012 223 466

(51) Int. Cl.
F16K 11/22 (2006.01)
F16K 27/02 (2006.01)
F16K 31/04 (2006.01)
F02D 9/10 (2006.01)
F16K 11/052 (2006.01)

(52) U.S. Cl.
CPC .......... *F16K 27/0218* (2013.01); *F02D 9/109* (2013.01); *F16K 11/0525* (2013.01); *F16K 31/04* (2013.01); *Y02T 10/121* (2013.01); *Y10T 137/86847* (2015.04)

(58) Field of Classification Search
USPC ............................ 137/637, 637.1; 251/367
See application file for complete search history.

(56) References Cited

U.S. PATENT DOCUMENTS

2005/0241702 A1  11/2005  Blomquist et al.
2010/0206274 A1  8/2010  Furukawa

FOREIGN PATENT DOCUMENTS

| DE | 499 691 | 6/1930 |
|----|---------|--------|
| DE | 10 2009 04984 | 8/2010 |
| EP | 1 335 158 | 8/2003 |
| EP | 2 497 921 | 9/2012 |

*Primary Examiner* — John Fox
(74) *Attorney, Agent, or Firm* — Cozen O'Connor

(57) ABSTRACT

A valve for controlling two gas flows, having: two ducts, in each of which a flap is rotatably mounted on a shaft; an electric motor that drives a shaft via a gear unit; and a transmission mechanism which, depending on the movement direction of the first flap, drives the second flap. Each flap is arranged in a separate housing part and the two housing parts are connected to one another.

6 Claims, 1 Drawing Sheet

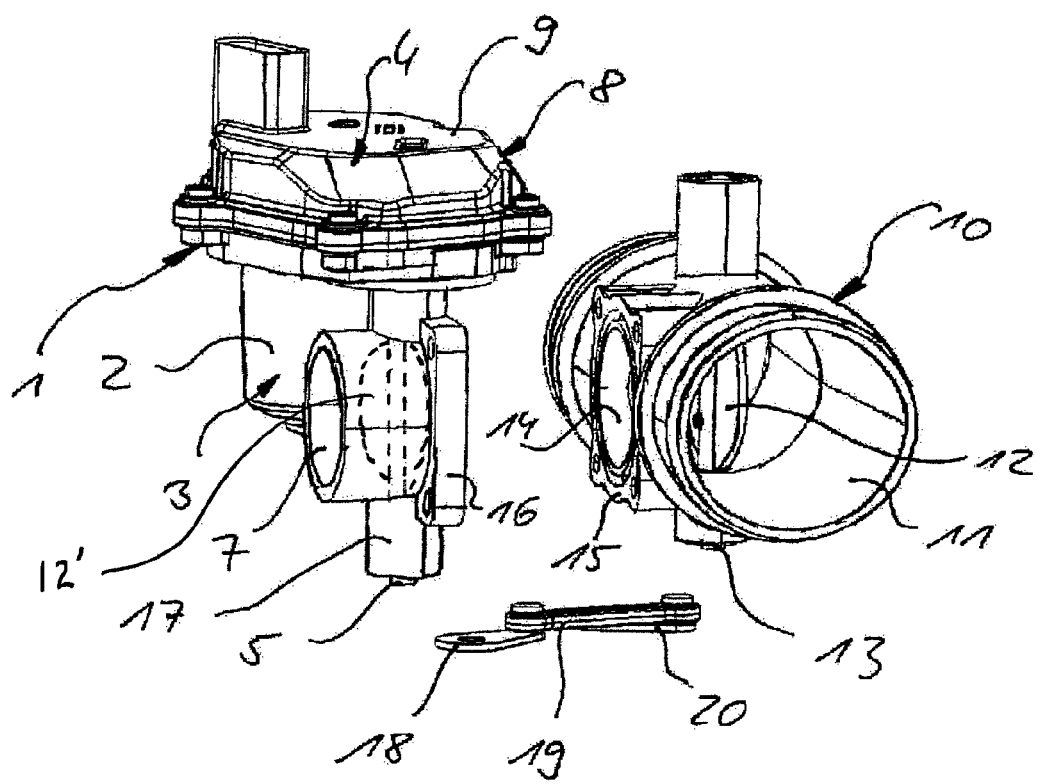

VALVE

CROSS REFERENCE TO RELATED APPLICATIONS

This is a U.S. national stage of application No. PCT/EP2013/075924, filed on Dec. 9, 2013. Priority is claimed on German Application No. DE102012223466.7 filed Dec. 17, 2012, the content of which is incorporated herein by reference.

BACKGROUND OF THE INVENTION

1. Field of the Invention

The invention relates to a valve for regulating two gas flows, wherein, in two ducts, there is arranged a respective flap mounted rotatably on a respective shaft, having an electric motor that drives one shaft via a gearing, and having a transmission mechanism that drives the second flap in a manner dependent on the movement of the first flap.

2. Detailed Description of Prior Art

Valves of this type are used in motor vehicles as air and exhaust-gas valves, and are known. In this case, gas flows pass through the ducts with the flaps, which gas flows are intended to be supplied individually, or mixed in certain ratios, to a third duct in accordance with the situation. This means that the angle of rotation of the first flap is assigned a particular angle of rotation of the second flap. Accordingly, the rotational angle of the first flap corresponds to a particular operating situation, to which the angle of rotation of the second flap must be adapted. The adaptation of the angle of rotation of the first flap to the corresponding operating situation is realized through the actuation of the electric motor. The corresponding adjustment of the second flap is then effected by way of the transmission mechanism. For this purpose, it is known for the flaps to be arranged in a housing. Owing to the duct arrangement, this has an influence on the arrangement of the flaps, of the shaft and of the drive. As a result, a housing of said type is of relatively complex construction.

SUMMARY OF THE INVENTION

An object of the invention is based on providing a valve which, in particular with regard to the housing, is of simple construction.

According to one embodiment, each flap is arranged in a housing part, and the two housing parts are connected to one another.

With the arrangement of each flap in a housing part, it is possible for the two individual housings (housing parts) to be of simpler design, whereby they can be produced more easily. Furthermore, the fixtures, such as flap and shaft, can be installed more easily. Here, the additional assembly step for the connection of the two individual housings involves considerably less outlay. A further advantage is that, for the individual housings, use can be made of already existing housings, which is likewise conducive to a simplification of the valve.

In an advantageous refinement, the two housings are screwed together. In this way, a secure and above all gas-tight connection of the two housings parts is realized. A further advantage is that the flap with the shaft can be installed in each housing in advance, before the two housings are connected to one another.

In one embodiment, the two housings parts are composed of different materials. The different materials selection permits an optimum adaptation of the respective housing to the field of use. For example, a thermally highly loaded housing, which conducts an exhaust-gas flow may be produced from a metal or a metal alloy, preferably cast aluminum, whereas the less intensely loaded housing may be composed of a plastic. Aside from the lower costs, the lower weight is a major advantage here.

An advantage of the valve being formed from two housings parts comes to bear in particular if the duct configuration is relatively complex. For example, the separate housings or housing parts permit an optimum adaptation to the respective duct, whereas the connection of the two housings can be configured subsequently. Such a duct configuration may exist even if the two ducts are arranged at an angle, preferably at right angles, to one another.

For the two gas flows to be controlled using only one electric motor drive, the two flaps are connected to one another by a transmission mechanism. The movement of the two flaps relative to one another can be adapted to a multiplicity of different movement profiles. In a structurally particularly simple refinement, this is realized by two levers and a coupling rod that connects the levers.

BRIEF DESCRIPTION OF THE DRAWINGS

The invention will be described in more detail on the basis of an exemplary embodiment. In the FIGURE:

The FIGURE is an exploded illustration of the valve according to the invention.

DETAILED DESCRIPTION OF THE PRESENTLY PREFERRED EMBODIMENTS

The valve illustrated in the FIGURE is composed of a first housing 1 with a chamber 2 in which an electric motor 3 is arranged. A shaft 5 is driven by a gearing 4. A first flap 12' is fastened to the shaft 5, which opens or closes a first duct 7 as a result of a rotation of the shaft 5. The gearing 4 is arranged in a further chamber 8 of the first housing 1, said further chamber being closed off by way of a cover 9. The valve furthermore has a second housing 10 with a second duct 11 in which a second flap 12 is arranged. The second flap 12 is fastened to a second shaft 13, such that the second flap 12 opens or closes the second duct 11 when the second shaft 13 rotates. Downstream of the flap 12 as viewed in the flow direction, the second housing 10 has an opening 14 that issues into the second duct 11, said opening having, on the outer side, a flange 15. The flange 15 is connected to a further flange 16, which is arranged on the end of the first duct 7 of the first housing 1.

The first shaft 5 extends through the first housing 1 by way of bearing bore 17. A first lever 18 is fastened to the end of the shaft 5, which is connected by way of a coupling rod 19 to a second lever 20, which in turn is fastened to the end of the second shaft 13. In a manner dependent on the arrangement of the levers 18, 20 with respect to the position of the respective flap, different mixing ratios of the two gas flows can be generated at corresponding rotational angles of the flaps. Fresh air flows via the second duct 11, which fresh air has exhaust gas admixed to it via the first duct 7. Owing to the high temperatures of the exhaust gas, first housing 1 is composed of an aluminum alloy. The second housing 10 is composed of plastic, as the exhaust gas is admixed to the cool fresh air, and thus the housing 10 is subjected to a significantly lower thermal load.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve configured to regulate two gas flows, comprising:
   a first housing part composed of a first material having a first duct;
   a first shaft arranged in the first housing part;
   a first flap mounted rotatably on the first shaft and arranged in the first duct;
   a second housing part composed of a second material that is different than the first material connected to the first housing part and having a second duct;
   a second shaft arranged in the second housing part;
   a second flap mounted rotatably on the second shaft and arranged in the second duct;
   an electric motor configured to drive the first shaft; and
   a transmission mechanism configured to drive the second flap in a manner dependent on a movement of the first flap,
   wherein the first material and the second material are selected from the group consisting of metal and plastic.

2. The valve as claimed in claim 1, wherein the first housing part and the second housing part are screwed together.

3. The valve as claimed in claim 1, wherein the first duct and the second duct are arranged at an angle with respect to each other.

4. The valve as claimed in claim 1, wherein the transmission mechanism comprises a coupling rod and at least one lever.

5. The valve as claimed in claim 3, wherein the angle is a right angle.

6. The valve as claimed in claim 1, wherein the electric motor drives the first shaft via a gearing.

* * * * *